(12) United States Patent
Vitomir et al.

(10) Patent No.: US 8,912,244 B2
(45) Date of Patent: Dec. 16, 2014

(54) NON-FILM FORMING COMPOSITIONS AND METHODS OF PROTECTING CURED CONCRETE AND CEMENTITIOUS MATERIALS

(71) Applicant: Protocol Environmental Solutions Inc., Coquitlam (CA)

(72) Inventors: Sergio Vitomir, New Westminster (CA); Floyd Wandler, Port Coquitlam (CA)

(73) Assignee: Protocol Environmental Solutions Inc., Coquitlam (CA)

( * ) Notice: Subject to any disclaimer, the term of this patent is extended or adjusted under 35 U.S.C. 154(b) by 0 days.

(21) Appl. No.: 13/791,363

(22) Filed: Mar. 8, 2013

(65) Prior Publication Data
US 2013/0324630 A1 Dec. 5, 2013

Related U.S. Application Data

(60) Provisional application No. 61/609,028, filed on Mar. 9, 2012, provisional application No. 61/694,472, filed on Aug. 29, 2012.

(51) Int. Cl.

| | | |
|---|---|---|
| *C08G 77/00* | (2006.01) |
| *B01F 17/00* | (2006.01) |
| *C09K 21/14* | (2006.01) |
| *C04B 24/42* | (2006.01) |
| *C04B 41/00* | (2006.01) |
| *C04B 41/53* | (2006.01) |
| *C04B 41/72* | (2006.01) |

(52) U.S. Cl.
CPC ............... *C04B 24/42* (2013.01); *C04B 41/009* (2013.01); *C04B 41/5315* (2013.01); *C04B 41/72* (2013.01)
USPC ........................ 521/154; 106/287.24; 523/179

(58) Field of Classification Search
USPC ........................ 521/154; 106/287.24; 523/179
See application file for complete search history.

(56) References Cited

U.S. PATENT DOCUMENTS

| | | | |
|---|---|---|---|
| 3,688,829 A | | 9/1972 | Jones |
| 6,165,262 A | * | 12/2000 | Kono et al. .................... 106/802 |
| 7,625,960 B2 | * | 12/2009 | Garner ............................... 524/5 |
| 7,632,797 B2 | * | 12/2009 | Moses et al. .................. 510/384 |
| 7,794,537 B2 | * | 9/2010 | Barlet-Gouedard et al. . 106/672 |
| 2012/0195848 A1 | | 8/2012 | Lu et al. |

FOREIGN PATENT DOCUMENTS

EP 0614860 3/1994

* cited by examiner

*Primary Examiner* — Nathan M Nutter
(74) *Attorney, Agent, or Firm* — Fish & Tsang LLP

(57) ABSTRACT

Contemplated compositions and methods for protection of concrete and various other cementitious materials comprise a step of formation of a mesoporous polymeric network within the concrete or other cementitious material, wherein the network further includes a cationic component that forms a substantially insoluble precipitate upon reaction with sulfuric acid to so form a composite barrier against further attack by sulfuric acid.

16 Claims, No Drawings

NON-FILM FORMING COMPOSITIONS AND METHODS OF PROTECTING CURED CONCRETE AND CEMENTITIOUS MATERIALS

This application claims priority to our co-pending U.S. Provisional Applications having Ser. Nos. 61/609,028, filed Mar. 9, 2012, and 61/694,472, filed Aug. 29, 2012.

FIELD OF THE INVENTION

The field of the invention is protection and rehabilitation of concrete and cementitious materials, and especially concrete and cementitious materials exposed to sulfuric acid attack.

BACKGROUND OF THE INVENTION

Industrial and utility concrete is often exposed to various acidic substances, and exposure to sulfuric acid is especially problematic for devices and structures in the mining industry, water treatment and chemical manufacturing plants, sewers, and manholes. To protect such structures from sulfuric acid vapors, mist, or liquid sulfuric acid, specialized film forming coatings can be applied. Alternatively, topical treatment of exposed structures with potassium silicate via dry gunning is also frequently employed for protection.

Unfortunately, coating failure using such conventional materials occurs rather frequently and subsequent damage to the underlying concrete progresses often rapid. The life expectancy of specialized acid resistant coatings such as epoxies, vinyl esters, and polyurethanes proofs to be substantially less than adequate and thus requires removal of the failed coating and re-application of a new coating. Moreover, even relatively small cracks in topical coatings will typically lead to substantial and rapid spreading damage. Surveillance of integrity of the coating is therefore often required, which adds to the significant cost of protection.

Likewise, re-coating of in service concrete surfaces is often problematic, and especially where the concrete was already subject to sulfuric acid attack. For example, unless salts, and especially sulfate salts, are removed from the surface and sub-surface areas of the concrete, new coatings will tend to fail and damage to the concrete will continue to develop. To avoid such damage, the surface of the concrete is in many cases treated by water blasting and/or treatment with selected complexing agents. However, water blasting and treatment with currently known complexing agents will often not provide sufficient salt removal, and re-coating is frequently required after only a very short time.

Therefore, even though numerous methods and compositions are known in the art to help protect concrete from sulfuric acid attack, all or almost all of them suffer from one or more disadvantages. Thus, there is still a need for improved compositions and methods of protecting cured concrete and cementitious materials.

SUMMARY OF THE INVENTION

The inventive subject matter is directed to compositions and methods of protecting concrete and other cementitious structures from sulfuric acid attack. Most preferably, protection is achieved by forming within the concrete or cementitious structure a polymeric mesoporous network that further comprises a cationic component that, upon reaction with the sulfate anion of sulfuric acid, forms a substantially insoluble precipitate to thereby produce a composite barrier. Thus, sulfuric acid is not only inactivated, but also used to form a barrier against further sulfuric acid penetration.

Where desirable, especially for in-service concrete or cementitious material, the material can be pre-treated with a composition that will destabilize previously formed calcium sulfate (and other $Ca^{2+}$ salts) to allow removal of these compounds prior to formation of the polymeric mesoporous network. Such pre-treatment will also assist in neutralization of the acidic pH in the in-service concrete or cementitious material.

In one aspect of the inventive subject matter, the inventors contemplate a method of protecting a volume of concrete or cementitious material from sulfuric acid attack that includes a step of forming within the volume a mesoporous polymer network from a plurality of precursor compounds, wherein one or more cationic components are included in the mesoporous polymer in an amount sufficient to form a substantially insoluble precipitate within the mesoporous polymer upon reaction with sulfuric acid to thereby form a composite barrier within the concrete or a cementitious material.

In particularly preferred aspects, the precursor compounds may be various silanes, organosilanes, siloxanes, organosiloxanes, silicate, and/or organosilicates. Thus, it is also preferred that the mesoporous polymer network is formed using an acid catalyst. Especially preferred cationic components include an alkaline earth metal ion, and/or at least some of the precursor compounds will form a covalent bond with calcium silica hydrate in the concrete or cementitious material. While not limiting to the inventive subject matter, it is further preferred that the volume has a depth (as determined from the surface of the volume) of at least 2 mm, and more typically at least 3 mm.

For example, is preferred methods, the mesoporous polymer network is formed from an aqueous solution comprising an organosilane, an alkoxysilane, and/or an organosilicate, a strontium or barium salt of a carboxylic acid, hydrochloric acid, phosphoric acid, sulfuric acid, and/or nitric acid, and optionally an alcoholic co-solvent. In addition, it is also contemplated that the volume is pre-treated with a chelating agent in an amount effective to convert one or more insoluble calcium salts into a soluble calcium complexes that can then be washed off the pre-treated volume. To allow prolonged contact with the volume, it is typically preferred that the chelating agent is formulated in an aqueous alkaline composition that optionally contains a thickener.

Therefore, in another aspect of the inventive subject matter, the inventors contemplate a structure (e.g., structural support, a holding tank, a bridge, or a building, etc.) that includes concrete or a cementitious material in which a mesoporous polymer network is formed within the concrete or cementitious material, and wherein the mesoporous polymer network comprises a plurality of silicon-containing repeat units. One or more cationic components are also included within the mesoporous polymer in an amount sufficient to form a substantially insoluble precipitate within the mesoporous polymer upon reaction with sulfuric acid to thereby allow formation of a composite barrier within the concrete or cementitious material. Most preferably, the silicon-containing repeat units are various silanes, organosilanes, siloxanes, organosiloxanes, silicates, and/or organosilicates, and the cationic components comprise strontium cations or barium cations.

Therefore, and viewed from a different perspective, the inventors also contemplate an aqueous liquid composition for protecting a volume of concrete or cementitious material from sulfuric acid attack. Particularly preferred compositions include a plurality of silicon-containing monomers suitable for forming a mesoporous polymer within the concrete or cementitious material, and one or more cationic components in an amount sufficient to form a substantially insoluble precipitate within the mesoporous polymer upon reaction with sulfuric acid to thereby form a composite barrier. Contemplated compositions will typically also include an acid catalyst, and an optional (alcoholic) co-solvent.

In especially preferred compositions, the silicon-containing monomers are selected from the group consisting of an organosilane, an alkoxysilane, and an organosilicate, the cationic components are selected from the group consisting of a strontium salt of a carboxylic acid, and a barium salt of a carboxylic acid, and the acid catalyst is selected from the group consisting of hydrochloric acid, phosphoric acid, sulfuric acid, and nitric acid.

For example, in suitable compositions the plurality of silicon-containing monomers are present in an amount of between 0.5 wt % to 40 wt %, the cationic components are present in an amount of between 5 wt % to 60 wt %, the alcoholic solvent is present in an amount of between 10 wt % to 25 wt %, and the liquid composition has a pH of between 0.5 and 5.0.

In a further aspect of the inventive subject matter, the inventors contemplate a method of treating a sulfuric acid affected in-service concrete in which in one step a surface of the sulfuric acid affected in-service concrete is contacted with an activated composition that includes a base and at least one of gluconic acid and a salt of gluconic acid. Most preferably, the step of contacting is performed for a time sufficient to (a) convert insoluble calcium salts into soluble calcium gluconate to a depth of at least 3 mm, and (b) neutralize residual acidity in the concrete to a depth of at least 3 mm.

In such methods, it is generally preferred that the gluconic acid and/or the salt of gluconic acid and the base are present in a ratio of at least 7:1, and/or that the gluconic acid and/or the salt of gluconic acid, and the base are present in a total amount of at least 30 wt %. Where desired, the activated composition may further include a thickening agent. Thus, an activated composition for treating sulfuric acid affected in-service concrete may comprise an aqueous formulation that includes a base and gluconic acid and/or a salt of gluconic acid, wherein the at least one of gluconic acid and the salt of gluconic acid and the base are present in a ratio of at least 5:1; and/or wherein the at least one of gluconic acid and the salt of gluconic acid and the base are present in a total amount of at least 30 wt %. Typically, the gluconic acid and/or the salt of gluconic acid and the base are present in an amount effective to (a) convert insoluble calcium salts into soluble calcium gluconate to a depth of at least 3 mm, and (b) neutralize residual acidity in the concrete to a depth of at least 3 mm.

For example, an activated composition will include the gluconic acid and/or salt of gluconic acid and the base are present in a ratio of at least 5:1, wherein the gluconic acid and/or salt of gluconic acid, and the base are present in a total amount of at least 30 wt %, and the activated composition may further comprises a thickening agent in an amount of between 0.1 wt to 3.0 wt %.

Various objects, features, aspects and advantages of the inventive subject matter will become more apparent from the following detailed description of preferred embodiments, along with the accompanying drawing figures in which like numerals represent like components.

DETAILED DESCRIPTION

The inventors have now discovered that concrete and other cementitious structures can be effectively protected against sulfuric acid attack by forming within the structure (typically to a depth of at least 2-5 mm) a polymeric mesoporous network that includes one or more agents that, when in contact with sulfuric acid, will precipitate to so form a composite barrier together with the polymeric mesoporous network. Thus, it should be appreciated that the composite barrier will be established and/or strengthened in response to sulfuric acid attack. Moreover, the inventors also discovered that the polymeric mesoporous network significantly reduces concrete moisture vapor transmission, in many cases by up to 50%(10-15 perms).

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In especially preferred aspects of the inventive subject matter, the polymeric mesoporous network is generated in situ using monomers under conditions that allow formation of polymeric structures, and most typically a three-dimensional network within a volume below the surface of the concrete or other cementitious material. It should therefore be noted that the compositions and methods presented herein are not film-forming materials, but materials that form a polymeric network within the bulk of the concrete or other cementitious material. It should be noted that the term "film forming" in the context of a composition means that a surface treated with the composition will exhibit a continuous layer of a polymeric reaction product after substantial completion of the polymerization reaction, wherein the majority of the continuous layer (at least 80%) is above the surface and does not covalently bond with the material below the surface. For example, a film-forming composition applied to concrete will polymerize into a polymer in which at least 80% of the polymeric material adheres to the surface of the concrete without penetration to more than 1 mm below the surface. Moreover, such film forming polymers (and monomers) will generally not covalently bind to the constituents of the concrete, and especially not covalently bind to the calcium silica hydrate (CSH). The terms "CSH" and "calcium silica hydrate" are used interchangeably herein and refer to the reaction products between the silicate phases of cement and water.

In contrast, a polymeric mesoporous network generated by the compositions disclosed herein will typically be a three-dimensional open-structured/pored network, with pore diameters of generally less than 100 micrometer, more typically less than 10 micrometer, even more typically less than 1 micrometer. Viewed from another perspective, typical pore diameters may be between 0.1-1000 nanometer, more typically between 1 and 250 nanometers, and more typically between 1 and 50 nanometer. Thus, it should be appreciated that the polymeric mesoporous network will generally be coextensive with (or within) the space between the aggregate in the concrete and/or throughout the space within cement phase. Moreover, especially preferred polymeric mesoporous networks will also be characterized by the fact that portions of the network or at least some of the monomers will covalently bind to the concrete or other cementitious material. Most typically, the covalent binding will be with the CSH.

For example, in one preferred aspect of the inventive subject matter, an aqueous liquid composition for protecting concrete or cementitious material from sulfuric acid attack comprises between about 50-60 wt % of barium or strontium citrate (or other carboxylic acid anion) to so provide one or more cationic components that can form the corresponding substantially insoluble barium or strontium sulfates upon reaction with sulfuric acid. Moreover, contemplated cationic components can further form at acidic pH the corresponding barium or strontium hydroxides and carbonates upon reaction with available calcium hydroxides and carbonates. In such case, it is especially preferred that the acidic pH is provided by an acid component within the formulation or concrete treatment. Contemplated aqueous liquid composition will further include between about 10-35 wt % of a silicate, an organosilicate and/or an organosilane (most preferably potassium and/or lithium silicate, alkoxysilicates, alkylsilanes, and alkoxysilanes) to provide the silicon-containing monomers suitable for forming a mesoporous polymer within the concrete or cementitious material. Viewed from another perspective, the monomers will form within the concrete or cementitious structure a polysilicate, polysilane, and/or polysiloxane (or chemical modification thereof). Most preferably, an acid catalyst, typically hydrochloric acid in an amount of between 0.01 wt % and 0.1 wt %, is added to achieve a pH of the solution of about pH 4.0 (+/−1.0), and methanol or ethanol is used as a water miscible co-solvent to assist in dissolution of the ingredients and penetration of the aqueous liquid composition into the concrete or other cementitious material.

In a typical example for use, the so formed composition is applied to the concrete or other cementitious material (e.g., with a brush or spray), to allow penetration into the material. Due to the acidic pH of the formulation, the reactivity of the silicon-containing monomers, and the reactivity of the cationic components with available calcium ions, a mesoporous polymer network is formed in the concrete or cementitious material within about several hours to several days (depending on the temperature, pH, and concentration of ingredients), and at least some of the cationic components will precipitate as substantially insoluble hydroxide and/or carbonate precipitates (which form together with the mesoporous polymer a composite barrier). As the so treated material is exposed to sulfuric acid, the acidity of the sulfuric acid will lead to further formation of barium or strontium hydroxides and carbonates as well as formation of barium or strontium sulfates, all of which are substantially insoluble and so form a composite barrier (made from the polymeric network and precipitated material) within the concrete or cementitious material. As used herein, the term "substantially insoluble precipitate" means that less than 1 wt %, and more typically less than 0.1 wt % of the precipitate are dissolved in water at pH7 and 20° C. It should further be appreciated that contemplated compositions and methods are not film forming compositions and will therefore leave no superficial film on the surface of the concrete after the treatment has occurred. Thus, painting of the treated concrete can commence as early as the concrete is dry (typically 6-24 hours, depending on the ambient temperature). Moreover, due to the nature of the barrier formed in the concrete or other cementitious material, the so treated material will exhibit a reduction of moisture vapor transmission by at least 10%, more typically at least 25%, and most typically between about 25-50% (10-15 perms).

Moreover, it should be especially appreciated that the compositions presented herein will provide a combined protection against sulfuric acid (i.e., from acid and sulfate attack). While not wishing to be bound by any particular theory or hypothesis, and with respect to acid attack the inventors contemplate that at least a portion of the strontium and/or barium salts are dissociated in the formulation and react with the free calcium ions (e.g., those present in calcium hydroxide and calcium carbonate) in concrete, resulting in the formation of strontium and/or barium hydroxides and carbonates that have a substantially lower solubility than the corresponding calcium salts, which is initiated and accelerated by the typically acidic pH of the composition. Consequently, it should be appreciated that the substitution of free calcium ions with strontium and/or barium cations imparts acid resistant properties to the so treated concrete. Moreover, at least another portion of the strontium and/or barium salts, when in contact with sulfuric acid, will react with the sulfate of the sulfuric acid to generate the corresponding substantially insoluble strontium and/or barium sulfates. It is thought that these sulfates will then seal the mesoporous matrix, resulting in a non reactive inert barrier against further sulfuric acid attack.

In still further contemplated aspects, it should be noted that the exact composition of the formulation may vary considerably. For example, it is generally preferred that the alkaline earth metal may be present (typically as a salt or complex) in a relatively wide range, and suitable ranges include from between about 5 wt %-15 wt %, 15 wt %-25 wt %, 25 wt %-50 wt %, 50 wt %-65 wt %, and even more. Likewise, in further preferred aspects, organosilanes and/or precursors as well as organic silicates may be present from 0.5 to 50 wt %, more preferably from 5 to 40 wt %, and most preferably from 10 to 35 wt % in the total composition. It is also preferred that an acid catalyst (and most preferably an inorganic acid catalyst) is present in an amount sufficient to catalyze and/or initiate polymerization, and/or to promote formation of corresponding alkaline earth metal hydroxides/carbonates from available calcium hydroxides/carbonates. Thus, suitable quantities of acid catalyst will generally be in the range of between 0.01 and 1.0 wt % in the total composition, and most typically between 0.05 and 0.5 wt %. Viewed form a different perspective, it is preferred that the pH of final composition is in the range of between 0.5 to 6, and more preferably between 3.0 to 5.0, and most preferably about pH=4.

In addition, it should be recognized that contemplated compositions may further include a co-solvent, typically in an amount sufficient to assist complete dissolution of the components of the formulation and/or to enhance penetration of the formulation into the concrete or other cementitious material. For example, suitable co-solvents will be present in an amount of between 1-30 wt %, more typically 5-20 wt %, and most typically 15-25 wt %. The balance of the formulation is preferably water (or in some cases a water soluble solvent). It should still further be appreciated that contemplated formulations may be prepared at the time/site of use from four different components (i.e., cationic component, silicon-containing monomers, acid catalyst, and co-solvent), or from sub-combinations thereof (e.g., mixture of cationic component and silicon-containing monomers, plus acid catalyst solution, plus co-solvent solution; or mixture of cationic component and acid catalyst, plus mixture of silicon-containing monomers and co-solvent; etc.).

With respect to the particular cationic component it is in most instances preferred that the cationic component comprises strontium and/or barium cations, typically in the form of salts of a carboxylic acid (e.g., citric, gluconic, malic, tartaric acid) or salt of an organic acid (e.g., nitric or sulfonic acid). However, various alternative cations are also deemed suitable for use and especially include those that form insoluble precipitates with sulfuric acid. Therefore, particularly preferred alternative cations include $Pb^2$ and $Hg2+$ cations where environmental conditions allow or otherwise dictate, and $Ag^+$ where economically warranted. On the other hand, organic cations are also deemed appropriate and will typically include one or more quaternary ammonium groups, or a protonated ammonium group. Thus, viewed from another perspective, any cationic compound is deemed suitable that will react with sulfuric acid to form a precipitate or otherwise insoluble product. Moreover, cationic components are typically preferred where such components are reactive with available calcium compounds in the concrete, and especially with CSH.

Similarly, the particular nature of the silicon-containing monomer may vary considerably and especially preferred monomers include reactive organosilanes, alkoxysilanes, and/or organic silicates. Most preferably, suitable silicon-containing monomers will include those that undergo a polymerization reaction that is initiated by acidic pH, and/or that are also reactive with one or more hydroxyl groups and $SiO_2$ available in the CSH and/or aggregate to thereby anchor the polymer in the CSH and/or aggregate. It should be noted that concrete is typically alkaline (i.e., with a pH above 7). Thus, not only addition of acid catalyst at the time of treatment will lead to polymerization, but also later exposure to sulfuric acid in cases where polymerization was not complete. Consequently, a chemically inert acid resistant mesoporous silica polymeric material is formed in the concrete or cementitious material that bonds to $SiO_2$ (sand and aggregate present in concrete) by covalent bonds. In particularly preferred aspects, the silicon-containing monomer forms a covalent bond with the CSH. The significance of this bond is the protection of CSH by the compositions presented herein.

While not limiting to the inventive subject matter, it is further preferred that one or more water miscible co-solvents, and especially alcohol is used to enhance solubility of the silicon-containing monomers, and/or improve penetration of the formulation into the concrete material Most preferably, the co-solvent is methanol or ethanol, or a low molecular weight diol or ketone (e.g., propane diol, acetone, etc.), acetonitrile, DMSO, DMEA, acetic acid, is present in the composition from 10-25%. Due to the relatively low viscosity and low evaporation factor of contemplated compositions, the compositions will readily penetrate the porosity space in the concrete and therefore allow for deep penetration below the surface, typically at least 3 mm, even more typically at least 4 mm, and most typically at least 5 mm.

In still further contemplated aspects of the inventive subject matter, treatment of the concrete or other cementitious structure is performed on an "in service" concrete or other cementitious structure that typically already has undergone at least some exposure to and/or attack by sulfuric acid. The term "in-service" in the context of concrete and/or other cementitious material/structure means that the concrete or other material/structure is part of a structure that has commenced operation for its intended purpose (e.g., holding tank in operation, wall of a building or other structure that operated in its intended use, etc.)

Most typically, in-service concrete and/or other cementitious material/structure has been exposed to sulfuric acid for a period sufficient to adversely affect (micro)structural integrity. Viewed from another perspective, sulfuric acid affected concrete is characterized by significant reduction (i.e., at least 10%) of calcium hydroxide in the cement and/or CSH phase as compared to unaffected concrete. Thus, sulfuric acid affected concrete may also be characterized by at least partial exposure of aggregate, as well as by weight loss (typically at least 5 wt %), and/or loss of compressive strength (typically at least 5%, more typically at least 10%. In most cases, sulfuric acid affected concrete will exhibit macroscopic pitting and/or crumbling.

As a consequence of sulfuric acid attack, various decomposition products are present in the concrete or other cementitious material, and most typically calcium salts of various acids and especially sulfuric acid (e.g., gypsum). If such salts are not removed from in-service concrete, treatment with the compositions contemplated herein as well as treatment with other coatings, primers, or paint will have significantly less penetration into and adherence to the concrete (or cementitious material). Therefore, effective removal of such salts is highly desirable.

In one preferred aspect of the inventive subject matter, the inventors have discovered that compositions can be prepared that are able to react, destabilize, and convert insoluble calcium salts (e.g., gypsum) on the surface and below the surface (e.g., 3-5 mm, and even deeper) into soluble and easy rinsable residue. At the same time, any residual acidity from the acid attack is advantageously neutralized. The resulting concrete after the pretreatment (and pressure washing where desirable) is substantially free of gypsum on the surface and below the surface, with significantly higher porosity, which in turn allows a dramatic increase in penetration of primers and/or sealers. Moreover, the compositions contemplated herein provide no interference in bond formation of the coating and the substrate and so preserve the bond against failure.

In further preferred aspects of the inventive subject matter, compositions contemplated herein are formulated as a cling type material and can be spayed, brushed, rolled on horizontal, vertical, and overhead concrete surfaces. While not limiting to the inventive subject matter, it is generally preferred that the composition will be in contact with the sulfuric acid affected in-service concrete for several hours, typically at least two hours, more typically at least four hours, and most typically at least six hours.

It should be noted that similar compositions have been reported (U.S. Pat. No. 3,688,829) for breakdown of scale in oil wells. However such known compositions were not only used in a different field, but are also chemically distinct. Among other differences, the compositions of the '829 reference require and are limited to a substantially lower ratio of gluconate to KOH, and further operate only at relatively low concentrations of the gluconate/KOH mix. In contrast, the compositions presented herein have a high ratio of gluconate to KOH, and are operable and effective at very high concentrations of the gluconate/KOH mix.

In particularly preferred aspects, contemplated compositions will comprise gluconic acid and/or salts of gluconic acid (preferably sodium gluconate) present in composition at 10-40 % by weight, and a base activator such as sodium or potassium hydroxide at 1-5 % by weight. Where the composition is prepared as a gel or otherwise thickened material, a thickener can be added. While the PHOSITA is well aware of various suitable thickeners, especially preferred thickening agents include water soluble agents. Thus, suitable thickening agents include hydroxy methyl, -ethyl, or -propyl cellulose at 0.1-3.0 % by weight. In most preferred aspects, the composition is formulated as an aqueous formulation. However, co-solvents and non-aqueous solvents are also deemed suitable.

While not wishing to be bound by any particular theory or hypothesis, the inventor contemplates that the activated gluconate anion has the affinity and preferentially chelates free calcium ions. When gypsum is present, the chelation reaction will occur, resulting in calcium gluconate and a soluble sulfate. The calcium gluconate is released from the concrete to the surface, typically as a white efflorescent powder that is easily removed by pressure washing. Other calcium salts will react in a similar fashion resulting and will produce an easy to rinse surface deposited residue.

Thus, particularly preferred compositions will comprise gluconic acid and/or gluconates 10 to 40 % by weight, and more preferably from 25 to 40 % by weight in the final composition. Moreover, such compositions will also include a caustic activator that is preferably present from 1 to 5 % by weight in the final composition. Where desired, a (e.g., cellulosic) thickener may be present from 0.1 to 3 % by weight in the final composition to so form a thickened formulation or gel. In most preferred aspects, the balance of the formulation is water (optionally in admixture with one or more water soluble co-solvents.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of protecting a volume of concrete or cementitious material from sulfuric acid attack, comprising:
    forming within the volume a mesoporous polymer network from a plurality of precursor compounds, wherein the mesoporous polymer network is formed using an acid catalyst; and
    including in the mesoporous polymer one or more alkaline earth metal cationic components in an amount sufficient to form a substantially insoluble precipitate within the mesoporous polymer upon reaction with sulfuric acid.

2. The method of claim 1 wherein the plurality of precursor compounds are selected form the group consisting of a silane, an organosilane, a siloxane, an organosiloxane, a silicate, and an organosilicate.

3. The method of claim 1 wherein the alkaline earth metal cationic components comprise strontium or barium ion.

4. The method of claim 1 wherein the volume has a depth as determined from a surface of the volume of at least 2 mm.

5. The method of claim 1 wherein at least some of the precursor compounds form a covalent bond with calcium silica hydrate in the concrete or cementitious material.

6. The method of claim 1 wherein the mesoporous polymer network is formed from an aqueous solution comprising (a) one or more of an organosilane, an alkoxysilane, and an organosilicate, (b) one or more of a strontium salt of a carboxylic acid and a barium salt of a carboxylic acid, (c) one or more of hydrochloric acid, phosphoric acid, sulfuric acid, and nitric acid, and optionally (d) an alcoholic co-solvent.

7. The method of claim 1 further comprising a step of pre-treating the volume with a calcium ion chelating agent in an amount effective to convert an insoluble calcium salt into a soluble calcium complex.

8. The method of claim 7 wherein the chelating agent is formulated in an aqueous alkaline composition that optionally contains a thickener.

9. A method of protecting a volume of concrete or cementitious material from sulfuric acid attack, comprising:
    forming within the volume a mesoporous polymer network from a plurality of precursor compounds;
    including in the mesoporous polymer one or more alkaline earth metal cationic components in an amount sufficient to form a substantially insoluble precipitate within the mesoporous polymer upon reaction with sulfuric acid; and
    wherein the mesoporous polymer network is formed from an aqueous solution comprising (a) one or more of an organosilane, an alkoxysilane, and an organosilicate, (b) one or more of a strontium salt of a carboxylic acid and a barium salt of a carboxylic acid, (c) one or more of hydrochloric acid, phosphoric acid, sulfuric acid, and nitric acid, and optionally (d) an alcoholic co-solvent.

10. The method of claim 9 wherein the plurality of precursor compounds are selected form the group consisting of a silane, an organosilane, a siloxane, an organosiloxane, a silicate, and an organosilicate.

11. The method of claim 9 wherein the mesoporous polymer network is formed using an acid catalyst.

12. The method of claim 9 wherein the alkaline earth metal cationic components comprise strontium or barium ions.

13. The method of claim 9 wherein the volume has a depth as determined from a surface of the volume of at least 2 mm.

14. The method of claim 9 wherein at least some of the precursor compounds form a covalent bond with calcium silica hydrate in the concrete or cementitious material.

15. The method of claim 9 further comprising a step of pre-treating the volume with a calcium ion chelating agent in an amount effective to convert an insoluble calcium salt into a soluble calcium complex.

16. The method of claim 9 wherein the chelating agent is formulated in an aqueous alkaline composition that optionally contains a thickener.

* * * * *

UNITED STATES PATENT AND TRADEMARK OFFICE
CERTIFICATE OF CORRECTION

| | |
|---|---|
| PATENT NO. | : 8,912,244 B2 |
| APPLICATION NO. | : 13/791363 |
| DATED | : December 16, 2014 |
| INVENTOR(S) | : Sergio Vitomir et al. |

It is certified that error appears in the above-identified patent and that said Letters Patent is hereby corrected as shown below:

On the Title Page

Please remove:

Item (72) Inventor: Floyd Wandler, Port Coquitlam (CA)

Signed and Sealed this
Thirtieth Day of June, 2015

Michelle K. Lee
*Director of the United States Patent and Trademark Office*